J. F. O'CONNOR.
BODY BOLSTER SIDE BEARING FOR RAILWAY CARS.
APPLICATION FILED JULY 5, 1919.

1,361,483.

Patented Dec. 7, 1920.

Witnesses
Wm. Geiger
Una C. Perin

Inventor
John F. O'Connor
By Geo. I. Haight
His Atty.

UNITED STATES PATENT OFFICE.

JOHN F. O'CONNOR, OF CHICAGO, ILLINOIS, ASSIGNOR TO WILLIAM H. MINER, OF CHAZY, NEW YORK.

BODY-BOLSTER SIDE BEARING FOR RAILWAY-CARS.

1,361,483.     Specification of Letters Patent.    Patented Dec. 7, 1920.

Application filed July 5, 1919. Serial No. 308,826.

*To all whom it may concern:*

Be it known that I, JOHN F. O'CONNOR, a citizen of the United States, residing at Chicago, in the county of Cook and State of Illinois, have invented a certain new and useful Improvement in Body-Bolster Side Bearings for Railway-Cars, of which the following is a full, clear, concise, and exact description, reference being had to the accompanying drawings, forming a part of this specification.

My invention relates to improvements in body bolster side bearings for railway cars.

The object of my invention is to provide a simple and efficient self-centering side bearing.

Figure 1:
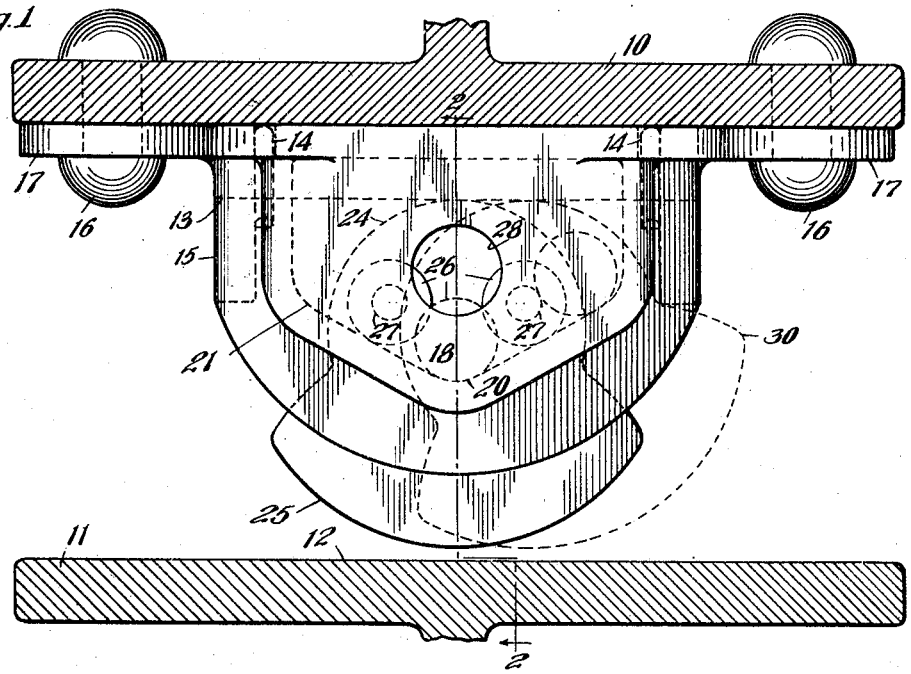
Figure 2:
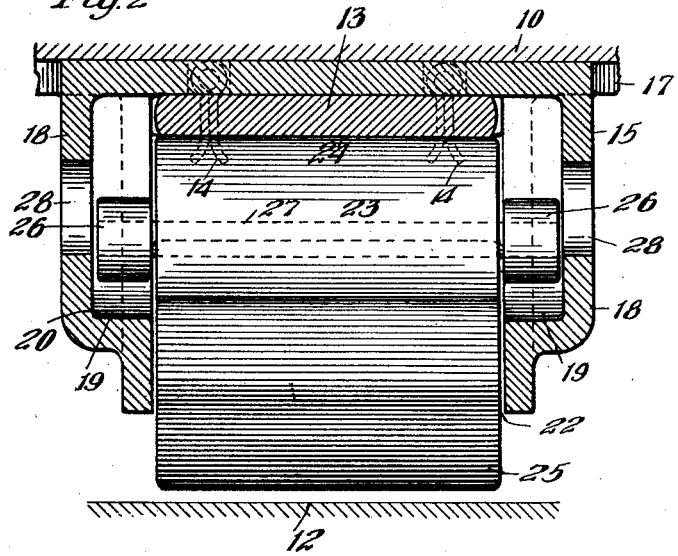

In the drawings forming a part of this specification, Figure 1 is a cross section of parts of the bolsters of a car showing my improved side bearing mounted between the same. Fig. 2 is a cross section taken on line 2—2 of Fig. 1.

In the drawings, the numeral 10 indicates the lower portion of a body bolster of a railroad car. The upper portion of a truck bolster is indicated by the numeral 11. The upper face 12 of the truck bolster functions as a lower bearing plate. The upper bearing plate is indicated at 13 and is secured by cotters 14, within the base member 15, which is attached to the body bolster 10 by the rivets 16 passing through the flanges 17 extended from the base member.

The base member is hollow, having inturned sides 18 forming a track 19, which is lowest at its central portion 20 and toward each end of the base member extends upwardly therefrom. The outline of the said track is clearly shown by the dotted lines indicated at 21 in Fig. 1 of the drawings. Between the tracks 19, and extending downwardly through the lower opening 22 of the base member is mounted the anti-friction member 23 having a curved upper bearing face 24 adapted to rock upon the upper bearing plate 13 and an oppositely curved lower bearing face 25 adapted to engage the lower bearing plate 12. The lower portion of the anti-friction member is made heavier than the upper portion, and the points of suspension thereof are above its center in order that through gravity it may be readily returned after an actuation to its normal central position. The suspension of the anti-friction member within the base member is made through the rollers 26, of which two are provided at each end of the anti-friction member 23 and are secured thereto by means of pins 27 extending therefrom and forming trunnions for the rollers 26.

In assembling the parts, the anti-friction member is inserted through the lower opening 22 of the base member, the pins and rollers being placed in their position in and on the anti-friction member through the opening 28 provided in the side walls of the base member. Then the anti-friction member is dropped until the rollers 26 engage the tracks 19. The upper bearing plate 13 is then inserted through an end wall of the base member and secured against accidental displacement by the cotters 14. Upon engagement of the anti-friction member between the bearing plates 13 and 12, the same will roll upon said bearing plates, the rollers 26 meanwhile traveling upon the tracks 19 and on their extreme movement the anti-friction members and rollers—if moved to the right for instance—will assume the position indicated by the dotted lines 30 in Fig. 1 of the drawings. When the anti-friction member is moved from its normal central position by the engagement of the bearing plates therewith, it will, upon release of the pressure, return to normal because of the tendency of the anti-friction member to swing toward normal and the tendency of the rollers 26 to roll upon the track 19 until they are, in reference to each other, in an equalized position.

It will be clear from the foregoing that the device is one in which the anti-friction member will readily return to its normal position after actuation and that the construction is simple and efficient in its operation.

I claim:

1. In a side bearing for railway cars, an upper bearing plate, a base member associated therewith, and an anti-friction member in the base member, the base member being provided with tracks at the ends of the anti-friction member and having a pair of rollers upon each track trunnioned upon the anti-friction member.

2. In a side bearing for railway cars, in combination a hollow retaining member provided with a bearing surface therein, and an anti-friction member in the base member, the base member being provided with tracks upwardly extended in opposite directions from their centers, the anti-friction member being provided at each of its ends with a pair of spaced-apart rollers mounted upon said tracks, said rollers being mounted on the anti-friction member.

3. In a side bearing for railroad cars, in combination, an upper bearing plate, a lower bearing plate, an anti-friction member adapted to and engaged between said bearing plates and a base member associated with the upper bearing plate, the base member being provided with tracks, the anti-friction member having a pair of spaced apart rollers at either end connected to said anti-friction member above its center of gravity and engaging said tracks.

4. In a side bearing for railroad cars, in combination, a base member having a bearing plate associated therewith, and an anti-friction member suspended in the base member, the base member being provided at each side with a track upwardly extended in opposite directions from its central portion, the anti-friction member having a pair of trunnions at each end, said trunnions being arranged on opposite sides of the central axis of the anti-friction member and each having a roller thereon, the said rollers engaging the tracks on the base member.

5. In a side bearing for railway cars, in combination, a retaining member adapted to be secured to the under side of a body bolster and provided with a bearing plate, an anti-friction member suspended in the base member, the base member having a track at each end of the anti-friction member, each track being upwardly extended in opposite directions from its center and the anti-friction member having suspending means extended from the ends thereof and engaging the adjacent track, said suspending means being in a plurality at each end of the anti-friction member and arranged on opposite sides of its central axis.

In witness that I claim the foregoing I have hereunto subscribed my name this 14th day of June, 1919.

JOHN F. O'CONNOR.